US012287443B2

United States Patent
Nadukandi et al.

(10) Patent No.: US 12,287,443 B2
(45) Date of Patent: Apr. 29, 2025

(54) METHOD FOR RECONSTRUCTING AT LEAST ONE TRACE IN A SEISMIC IMAGE

(71) Applicants: REPSOL, S.A., Madrid (ES); ADVANCED GEOPHYSICAL TECHNOLOGY INC., Sugar Land, TX (US)

(72) Inventors: Prashanth Nadukandi, Madrid (ES); Pablo Enrique Vargas Mendoza, Madrid (ES); Santiago Fernández Prieto, Madrid (ES); German Ocampo Botero, Madrid (ES); Wenyi Hu, Sugar Land, TX (US); Shirui Wang, Houston, TX (US); Pengyu Yuan, Houston, TX (US)

(73) Assignee: REPSOL, S.A., Madrid (ES)

( * ) Notice: Subject to any disclaimer, the term of this patent is extended or adjusted under 35 U.S.C. 154(b) by 416 days.

(21) Appl. No.: 17/872,776

(22) Filed: Jul. 25, 2022

(65) Prior Publication Data

US 2023/0066911 A1    Mar. 2, 2023

(30) Foreign Application Priority Data

Jul. 23, 2021    (EP) .................................... 21382674

(51) Int. Cl.
*G01V 1/34* (2006.01)
*G06N 3/08* (2023.01)

(52) U.S. Cl.
CPC .............. *G01V 1/345* (2013.01); *G06N 3/08* (2013.01); *G01V 2210/1299* (2013.01); *G01V 2210/1429* (2013.01); *G01V 2210/74* (2013.01)

(58) Field of Classification Search
CPC .......... G01V 1/345; G01V 2210/1299; G01V 2210/1429; G01V 2210/74; G06N 3/08
See application file for complete search history.

(56) References Cited

U.S. PATENT DOCUMENTS

| | | |
|---|---|---|
| 2019/0302290 A1 | 10/2019 | Alwon |
| 2020/0183031 A1 | 6/2020 | Denli et al. |
| 2020/0271805 A1 | 8/2020 | Hegge et al. |
| 2024/0168194 A1* | 5/2024 | Abubakar ............... E21B 49/00 |

OTHER PUBLICATIONS

Chai et al, Deep Learning for Irregularly and Regularly Missing 3-D Data Reconstruction, Jun. 2021.*
Liu et al, Deep-seismic-prior-based reconstruction of seismic data using convolutional neural networks, Apr. 2021.*
He et al, Seismic Data Consecutively Missing Trace Interpolation Based on Multistage Neural Network Training Process, Jun. 2021.*
Fang et al, Seismic data interpolation based on U-net with texture loss, Jan. 2021.*
Deep Learning for Irregularly and Regularly Missing 3-D Data Reconstruction (IEEE Transactions on Geoscience and Remote Sensing, IEEE, USA, vol. 59, No. 7, Jul. 1, 2021).

(Continued)

*Primary Examiner* — Mohamed Charioui
*Assistant Examiner* — Lynda Dinh
(74) *Attorney, Agent, or Firm* — Reising Ethington P.C.

(57) ABSTRACT

A method for reconstructing at least one trace in a seismic image of a common receiver and time domain includes a convolutional neural network trained under an unsupervised learning approach with a modified receptive field.

14 Claims, 12 Drawing Sheets

(56) References Cited

OTHER PUBLICATIONS

Seismic Data Consecutively Missing Trace Interpolation Based on Multistage Neural Network Training Process (IEEE Geoscience and Remote Sensing Letters, IEEE, USA, vol. 19, Jun. 30, 2021).
Deep-seismic-prior-based reconstruction of seismic data using convolutional neural networks (arxiv.org, Cornell University Library, 201 Olin Library Cornell University Ithaca, NY 14853, Nov. 20, 2019).

* cited by examiner

METHOD FOR RECONSTRUCTING AT LEAST ONE TRACE IN A SEISMIC IMAGE

CROSS-REFERENCE TO RELATED APPLICATION

This application claims the benefit of European Patent Application No. 21382674.6, filed Jul. 23, 2021, the entire contents of which are hereby incorporated by reference.

TECHNICAL FIELD

The present invention is related to a method for reconstructing at least one trace in a seismic image of a common receiver and time domain, the image comprising traces in time domain with seismic data and one or more traces to be reconstructed.

A first aspect of the invention is a method that is characterized by a specific use of a convolutional neural network trained under an unsupervised learning approach with a modified receptive field.

A second aspect of the invention is a deblending method based on the use of a reconstructing method according to the first aspect of the invention applied to a denoising step of a deblending process allowing a very effective data acquisition while keeping a high quality output data sets after being processed according to the first and/or second aspects of the invention.

BACKGROUND

One of the technical fields with a more intensive development is in the field of seismic data acquisition as daily exploration costs are very high.

Seismic data are occasionally uniformly distributed and sampled. In marine acquisitions, the seismic data are often sparse in one direction and dense in the other. Irregularity in marine data spatial distribution is inevitable due to cable drifting.

In land seismic data acquisitions, a large number of defective traces are not unusual, and big data gaps are also common due to various acquisition constraints.

When standard seismic processing tools are directly applied on these data, severe aliasing and strong artifacts are expected. The resulting image-quality degradation further leads to deteriorating amplitude versus off-set (AVO) analysis, ray density imbalance in velocity tomography, and deviating gradients in full Waveform Inversion (FWI) update.

A first technical challenge is posed, which consists in the reconstruction of the collected data to densely and uniformly gridded system.

Machine learning based interpolation methods have been disclosed as being more accurate and requires fewer human intervention compared with traditional interpolation methods. Some of these methods are supervised learning methods that need labeled seismic datasets (wherein labeled seismic dataset is interpreted in this context as a dataset where for each gappy seismic data is known the true value of the missing traces) and do not generalize well to new decimated/gappy datasets (testing set) with different characteristics to the training dataset. The existing unsupervised learning methods train generative models from random noise which has the downside that the interpolation result is not invariant to the random noise initialization, and the learned interpolation knowledge is hard to transfer across different shot-gather images. That is, every decimated shot-gather image requires an individual random noise generator wherein shot is the well-known term used for a seismic source.

A single shot-gather interpolation without information from neighboring shots is a challenging test problem.

Additionally, in traditional seismic acquisitions, the responses to different seismic sources are collected separately. Interferences among seismic responses are avoided by using large time intervals, typically from a few seconds to 30 seconds, between consecutive shots. Such separate-source acquisition methods incur high operating costs due to prolonged survey time and efforts. The aim for improving efficiency motivated the development of simultaneous-source acquisition.

A denser blended-acquisition is achieved in a reduced survey time by firing multiple shots using a random time-dithering scheme within a relatively short time interval. However, deblending is needed to separate simultaneous-source acquisition data into single-source responses to facilitate post-acquisition analysis.

Deblending is an under-determined problem and a first approximation is based on employing a so-called pseudo-deblending to obtain a solution using the least-squares method. Unfortunately, the pseudo-deblending procedure is not effective in removing unwanted interferences caused by blending noises.

Recent works in deblending methods focused either on attenuating the blending noise using filter-based strategies or separating the sources directly by formulating it as an inversion problem.

Therefore, a further challenge is to develop an effective deblending method for decoupling simultaneous-source acquisition data.

The present invention is a method for reconstructing at least one trace in a seismic image solving the first posed problem and, it can be further used for deblending seismic data.

SUMMARY

A first aspect of the invention is a method for reconstructing at least one trace in a seismic image of a common-receiver or, when receivers are uniformly spaced, common mid-point receiver or a common offset receiver; and, time domain, the image comprising traces in time domain with seismic data and at least one trace to be reconstructed. Common mid-point receiver is also known as common mid-point gather and common offset receiver is also known as common offset gather.

The method overcomes the identified drawback by carrying out the following steps:

deploying a convolutional neural network for predicting a trace, the convolutional neural network comprising at least one layer, wherein the at least one layer of the convolutional neural network comprises a kernel function with a blind-trace receptive field covering adjacent traces;

training the convolutional neural network using a plurality of traces of the seismic image, the blind-trace receptive field of the kernel function covering adjacent traces with data but not covering the trace located at the position of the trace to be reconstructed;

inputting the seismic image into the convolutional neural network predicting the value of the at least one trace to be reconstructed;

assigning the predicted value of the at least one trace to be reconstructed in the seismic image at the location of said trace to be reconstructed.

A seismic trace is a time series response to seismic sources recorded at a receiver position. According to the prior art, when the acquisition is carried out with separate-sources, the seismic data in the time domain can be represented as a multidimensional array $P_{ijk}{}^b=(x_i{}^s, x_j{}^r, t_k)$; where $x_i{}^s$ is the ith source position, $x_j{}^r$ is the jth receiver position and $t_k$ is the kth time sample.

The shape of the array P is $n_s \times n_r \times n_t$ where $n_s$ is the number of unblended shots, $n_r$ is the number of receivers and $n_t$ is the length of the time series.

The order of the indices in the P matrix can be taken in different order, the important thing is that one index is related to the receivers, another index is related to the sources and the remaining index is related to time. Any other order will result in operations that must take into account the order of the indices. Operations that lead to the same result by exchanging this order but are consistent with the chosen order are considered equivalent.

The P matrix can be represented as a three-dimensional volume where for example the time axis is vertical. From this matrix it is possible to define at least two set of 2D images, those corresponding to the values determined by planes parallel to the time and receiver number axes and those corresponding to the values determined by planes parallel to the time and source number axes. The first set is identified as a common-shot and time domain and the second set is identified as common-receiver and time domain. Additionally, it is possible to define two set of 2D images, those corresponding to the values determined by planes parallel to the time axis and constant sums of the source and receiver numbers, and those corresponding to the values determined by planes parallel to the time axis and constant differences of the source and receiver numbers. In the previous sentence, the first set is identified as common-midpoint and time domain and the second set is identified as common-offset and time domain. These two planes may be defined when receivers are uniformly spaced.

According to the first aspect of the invention, given a common-receiver and time domain image extracted from an acquired data set comprising traces in time domain with seismic data and at least one trace to be reconstructed, the method provides a reconstructed image.

According to the first step, a convolutional neural network is deployed intended for predicting a trace to be reconstructed. For instance, a trace that is not available from the data set acquired from a seismic survey. The convolutional neural network comprises at least one layer and the at least one layer comprises a kernel function with a blind-trace receptive field covering adjacent traces excluding the trace whose receptive field is being considered.

The image values are discrete values that correspond to a discrete time value and a discrete value that identifies either the receiver position number or the source number. From now on we will use either the matrix value or the pixel value, understanding that its implementation is by means of an image.

The reception field of a trace of the at least one layer will be a subset of the input image if the layer is the first layer or, if it is an intermediate layer or the last layer, then it will be a subset of a feature map obtained at the output of the immediately preceding layer. In any case, a data series of the image or the feature map according to the time axis will be deemed as a trace. Along the description, the feature map will be treated as an image comprising pixel values.

The kernel function is a function that may be expressed mathematically and, for a given reference pixel, evaluates an expression as a function of the pixel values of a bounded environment by providing a scalar value, the value that results in the pixel of the output feature map at the position of the reference pixel. The domain formed by the pixels involved in the function argument, the bounded environment, defines the receptive field.

According to the first step, the argument of the receptive field does not comprise pixels of the trace located at the reference pixel and therefore only values of adjacent traces. According to this feature, the receptive field is identified as a blind-trace receptive field.

The convolutional neural network is trained using a plurality of traces of the seismic image, the blind-trace receptive field of the kernel function covering adjacent traces with data but not covering the trace located at the position of the trace to be reconstructed. As a result, the learning method may be classified as unsupervised since the convolutional neural network is trained without the need of labeling preselected traces or images.

Once the convolutional neural network has been trained, the seismic image of a common-receiver or, when receivers are uniformly spaced, common mid-point receiver or a common offset receiver and, time domain comprising at least one trace to be reconstructed is inputted into it predicting the value of said trace. The predicted value of the trace to be reconstructed is assigned in the seismic image at the location where previously said trace to be predicted was located.

Although the kernel function can be expressed mathematically by means of a scalar function with its arguments, this function expresses the way in which the information is processed and combined from the information stored in the previous layer. For this reason, this kernel function could be instantiated in a computer program by means of an executable function but it could also be configured in a device by establishing the appropriate connections and logic gates that physically combine the information from one layer to the next.

According to an embodiment, it will be disclosed an example wherein the convolutional neural network is a U-net. The U-net comprising downscaling layers providing channels which allow the network to obtain context information that is subsequently propagated to higher resolution layers in the upscaling layers. Additionally, U-net based neural networks are chosen since the input image and the output image have the same size.

Directly applying a U-net based neural network as in the prior art for optimizing the unsupervised training loss will lead to a local minimum solution.

The strategy according to the present embodiment prevent the local minimum since at least one layer is a trace-blind layer.

According to an embodiment, the U-net comprises at least a down-sampling layer, wherein the at least one down-sampling layer is the layer with a kernel function with the blind-trace receptive field.

As a result, the blind-trace receptive field is used when the U-net is generating context information and, this context information is propagated to the high-resolution layer in order to predict traces to be reconstructed with a high accuracy. It has been proved that using the blind-trace receptive field in down-sampling layers the predicted trace is not distorted at high resolution and accurately predicted.

According to an embodiment, the blind-trace receptive field of the kernel function is determined by the following processing steps:

limiting the receptive field to cover one side according to the direction of the trace;

duplicating the image to be inputted into the receptive field resulting into a first copy of the image and a second copy of the image, the second copy of the image being rotated 180° with respect to the first copy of the image;

the first copy and the second copy of the image are inputted into the receptive field of the U-net and the resulting images being combined into a single image.

According to this embodiment, the inputted image is duplicated, one of the two images rotated 180° with respect to the other image. Since the receptive field has been limited to cover one side, the first image allows processing one side of the original image and the second image allows processing the other side of the original image in a very efficient manner.

In a preferred embodiment, the receptive field is limited at the side corresponding to the transversal direction of in which the data is stored. If matrices are stored by rows then the receptive field is limited at the upper part.

Once the first copy and the second copy of the image are inputted to the modified U-net resulting in two new n-channel output feature maps; these are combined into a single image comprising the predicted traces. According to a preferred embodiment, the two re-channel output feature maps are a 32-channel output feature maps.

According to a preferred embodiment, a one row offset is applied to both output feature maps to ensure a blind-trace receptive field before rotating them back and combining them. According to a preferred embodiment, the two images are combined by first concatenating the two output feature maps into a 2n-channel feature map followed by two 1×1 convolution steps. According to the preferred embodiment wherein the two n-channel output feature maps are a 32-channel output feature maps, said two output feature maps are concatenated into a 64-channel feature map.

According to a more preferred embodiment, in the first step we use a 32-filters 1×1 convolution followed by a ReLU activation layer resulting in a 32-channel feature map; in the last step we use a single-filter 1×1 convolution followed by a leaky ReLU activation layer resulting in a single-channel output image comprising the predicted traces.

According to an embodiment, the at least one layer with a blind-trace receptive field is a down-sampling layer and wherein any layer of the convolutional neural network further comprises an output for outputting a feature map and, wherein:

before inputting a feature map, output of a previous layer or the image if the current layer is the first layer, into the current layer, the feature map is padded by adding rows of zeros at the end of the feature map located at one side of the trace;

carrying out the convolution operation;

cropping out the same number of rows previously added wherein the cropping of the output feature map is carried out on the side opposite to the side on which rows were previously added.

In this particular embodiment, the blind-trace is implemented by a padding process. According to this process, the image or the feature map is padded by adding rows resulting in a larger image with the pixels shifted in the column direction.

The convolution operation is executed over the padded image or feature map and then, the resulting image is cropped out removing the same number of rows previously added on the side opposite to the side on which rows were previously added recovering a feature map with the size of the initial image.

According to an embodiment, the training process of the U-net uses a converging criterion based on an approximation error estimation $E_s$ for measuring the interpolation loss when predicting the reconstructed trace and said approximation error estimation $E_s$ being determined as a linear combination of a misfit loss and a regularization loss, the regularization loss being determined by the following steps:

determining the main energy area of the non-reconstructed image;

calculating the norm of the reconstructed image in the frequency domain limited to the area not being part of the main energy area, according to a predetermined norm.

If the original complete image is $y \in \mathcal{R}^{t \times n}$, the image with no traces to be reconstructed, where t and n represent the total sampling time and number of traces respectively, and the observed decimated image (the image with traces to be reconstructed) is represented by $x \in \mathcal{R}^{t \times n}$; then the set of indices of the decimated traces is represented by m where the cardinality of the set represent the number of missing traces or traces to be reconstructed. The decimation ratio may be written as r=|m|/n.

Given the set m, observed image x can be obtained by:

$$x = \sigma_m(y) \text{ such that } x[:, i] = \begin{cases} 0, & \forall i \in m \\ y[:, i], & \text{else} \end{cases}$$

where $\sigma_m(y)$ is the mask operation mapping from complete image to decimated image: $y \rightarrow x$. On the other hand, the reconstruction process may be expressed as an interpolation function mapping decimated image to complete image, $f_\theta(x)$: $x \rightarrow y$ where $f_\theta$ represent the neural network parameterized by $\theta$. The unsupervised training loss is then set up as:

$$L_\theta(m) = \|x - \sigma_m(f_\theta(x))\|$$

where $\|\cdot\|$ is the normalized $l_1$ norm.

the optimal solution can be obtained by $\theta^* = \arg\min_\theta L_\theta(m)$ Blind-trace network as disclosed prevents the identity mapping in the unsupervised learning task. But without extra steps, it fails to reconstruct regularly decimated seismic data. There is limited variance in the trace missing patterns for regularly decimated image, and the patterns between training and reconstructed traces are very different. In this description the term decimated will be interpreted as drop/miss data when referring to a trace and, regularly decimated will be interpreted as drop/miss data shows a regular pattern. This ill-posed interpolation problem is mitigated by adding a regularization guidance using an automatic spectrum suppression in the f-k domain.

If $\mathcal{F}(x)$ denotes the 2D Fourier transform, then $\mathcal{F}(x)$ is the decimated seismic data sorted in shot-gathers in the f-k domain. The main energy of the complete data (including first arrivals, ground roll and reflected energy) will be a fan with one or more apparent velocities, the energy being bounded in a certain area S from the f-k domain, a suppression mask $M \in \mathcal{R}^{t \times n}$ can be created satisfying $M_i=0$ if $i \in S$ and $M_i=1$ if $i \notin S$.

The error estimation $E_s$ is determined as a linear combination of a misfit loss and a regularization loss. According to a further embodiment, the linear combination only comprises a single parameter for the regularization loss that may be expressed as:

$$L_\theta(m, M) = \underbrace{\|x - \sigma_m(f_\theta(x))\|}_{\text{misfit loss}} + \underbrace{\alpha \|M \odot \mathcal{F}(f_\theta(x))\|}_{\text{regularization loss}}$$

where $\odot$ denote the entry-wise multiplication and $\alpha$ is the coefficient that balance the misfit loss and regularization loss.

After determining the main energy area of the non-reconstructed image, the regularization loss factor is estimated. Then, the next steps is determining the regularization loss by calculating the norm of the reconstructed image in the frequency domain limited to the area not being part of the main energy area, according to a predetermined norm.

Then the training process of the U-net is in an iterative process with a converging criterion based on an approximation error of $E_s$ estimated as the misfit loss plus the regularization loss multiplied by factor $\alpha$. Factor $\alpha$ is a positive value and according to some numerical experiments, the value of $\alpha$ has been chosen in the range $[10^{-4}, 10^{-2}]$. An appropriate $\alpha$ value can be determined by evaluation on a validation set. The validation set can be a group of undecimated traces that are not used in computing the misfit loss, i.e. these traces are masked out on purpose just for identifying $\alpha$ and will be used in the network training after $\alpha$ is determined.

According to an embodiment, the misfit loss is determined as the difference between the non-reconstructed image and the reconstructed image after removing the reconstructed trace/traces.

This miss fit may be expressed as $x - \sigma_m(f_\theta(x))$ measure by a predetermined norm.

According to a specific embodiment, the reconstructing method according to the first aspect of the invention is used for deblending seismic data.

As it has been disclosed, the seismic data in the time domain can be represented as a multidimensional array $P_{ijk}^b = (x_i^s, x_j^r, t_k)$ when the survey has been carried out without any blending conditions.

For blended acquisition $\sigma_l$ is defined as the lth source group containing a subset of source positions $x_i^s$. Within each $\sigma_l$ the shots are fired with relatively short and random delay times $\tau_{li}$ (dithering).

Therefore, according to this embodiment, a survey is carried out in which the data acquired in the receivers are blended because the sources are fired in groups in such a way that within each group it is not allowed to wait long enough for the acoustic signal of the previous fire to have disappeared.

The method according to this embodiment is as follows:
deploying a plurality of $n_s$ acoustic sources in the upper surface of the reservoir domain wherein the $n_s$ acoustic sources are grouped in B groups $\sigma_l$, l=1 . . . B, of acoustic sources, each acoustic source being only in one group $\sigma_l$ of sources and at a location $x_i^s$, i=1 . . . $n_s$ and, deploying a plurality of $n_r$ acoustic receivers in the upper surface of the reservoir domain at a location $x_j^r$, j=1 . . . $n_r$;

for each group $\sigma_l$, l=1 . . . B of acoustic sources, each acoustic source is shot with a random delay time $\tau_{li}$ and the response in the acoustic receivers stored in a data structure that may be represented by $P_{ljk}^b = (x_i^s, x_j^r, t_k - \tau_{li})$; wherein $t_k$ is the $k^{th}$ time sample in the time domain;

calculating, for each group $\sigma_l$, l=1 . . . B, the Fourier-transform $\Pi^b(:,:,\omega_k) = F\{P_{ljk}^b\}$ wherein $\omega_k$ is the $k^{th}$ frequency and ":" denoting variables depending in index i or index j;

for each frequency $\omega_k$ determining $æ^{LS}(:,:,\omega_k) = \Gamma^* \Pi^b(:,:,\omega_k)$ wherein $\Gamma^*$ is $$\Gamma^* = \Gamma_k^H D$$

being D a diagonal matrix and $\Gamma_k^H$ the conjugate transpose of $\Gamma_k$ the blending matrix that may be calculated from the random delay times $\tau_{li}$ as $$(\Gamma_k)_{li} = \begin{cases} e^{-\sqrt{-1}\omega_k \tau_{li}} & \text{for } x_i^s \in \sigma_l \\ 0 & \text{else} \end{cases}$$

calculating an Inverse Fourier Transform of $F^{-1}(\Pi^{LS}(:,:,\omega_k)) = P_{ljk}$;

the shot-gather ordering in the output $P_{ljk}$ is sorted to get the image $I_j$ of the trace data in the common-receiver or the common-midpoint receiver or the common-offset receiver and, time domain;

for each trace carrying out a deblending step by reconstructing the coherent signal of the traces using a reconstructing method according to any of those previously disclosed.

After acquiring the blended seismic data, for each group, the blended seismic data corresponding to such group is processed independently of the other groups. According to a very short survey, there is a single group of blended data and therefore all the seismic data is blended.

Step c) calculates the Fourier-transform wherein now the time variable is transformed to the frequency variable. Since this problem is overdetermined, a least square method is applied by calculating $\Pi^{LS}(:,:,\omega_k) = \Gamma^* \Pi^b(:,:,\omega_k)$. $\Gamma^*$ is the result of the multiplication of a diagonal matrix by the conjugate transpose of the blending matrix which shift common-receiver and time domain images in the time variable by multiplying by factor $e^{-\sqrt{-1}\omega_k \tau_{li}}$ those data being in the group of sources.

Once the data has been shifted and the least square solution calculated, a set of $n_r$ images are generated by selecting planes in the gather domain such as in the common-receiver domain from $P_{ljk}$ and then for each trace carrying out a deblending step by reconstructing the coherent signal of the traces using a reconstructing method according to any of those previously disclosed.

Steps c) and the following steps are expressed explicitly in the Transformed Fourier space because the formulation is very clear in order to obtain pseudodeblended data; however, the same result may be obtained by operating in time-domain by applying a time shifting process. Any method providing the same pseudodeblended data will be interpreted as being equivalent.

The diagonal matrix used for calculating $\Gamma^* = \Gamma_k^H D$ applies an scaling factor to each row of $\Gamma_k^H$ which is determined as $D = (\Gamma_k \Gamma_k^H)^{-1}$; nonetheless, this calculations are avoided in order to not scale the coherent information. In this case, the diagonal matrix may be represented as D=I. In this case; we will name the deblended data as pseudodeblended data.

Additionally, if the seismic survey is carried out firing each source only once then the condition $\sigma_m \cap \sigma_n = \emptyset$ is satisfied and rows of $\Gamma_k$ are orthogonal.

DESCRIPTION OF THE DRAWINGS

These and other features and advantages of the invention will be seen more clearly from the following detailed description of a preferred embodiment provided only by way of illustrative and non-limiting example in reference to the attached drawings.

FIG. 5 ranges from (a) to (f) showing examples of blended-unblended pairs using three different blending schemes. Figures (a), (b) and (c) are pseudo-deblended common receiver gathers from the three blending schemes identified as ("alternate", "half", and "continuous") respectively. Figures (d), (e) and (f) are the corresponding unblended data.

DETAILED DESCRIPTION OF THE INVENTION

As will be appreciated by one skilled in the art, aspects of the present invention may be embodied method that may be implemented as a computer program product, at least those parts manipulating the acquired seismic data.

In order to show an specific embodiment of the disclosed methods in a detailed manner, let $\mathcal{F}$ represent the 1-D Fourier transformation along the time axis, that is, for what has been named a trace, $\mathcal{F}^{-1}$ its inverse and $f_\theta(\cdot)$ is a denoising convolutional neural network (CNN) with parameters $\theta$. Further, let C denote the array concatenation operator which takes arrays and stacks them into a single higher-dimensional array, e.g. $\Pi = C\Pi_k$. With no unblended data available, a model that minimizes the unsupervised blending loss function is trained, being the loss function $$L_\theta(x, f_\theta(\cdot)) = \frac{1}{N}\sum_{k=1}^{N} \left\| x^{(k)} - \mathcal{F}^{-1} C\Gamma_m^H \Gamma_m(\mathcal{F} f_\theta(x^{(k)}))_m \right\|_1$$

and $= \{x^{(1)}, \ldots, x^{(N)}\}$, where the input $x = \mathcal{F}^{-1} C\Gamma_m^H \Pi_k^b$ is the pseudo-deblended data in the common receiver domain. $f_\theta(x)$ gives the prediction of the deblended data. The prediction of the model is blended again by the known blending matrix $\Gamma$. This result is the blended prediction: $\Gamma_m(\mathcal{F} f_\theta(x^{(k)}))_m$. The term $\mathcal{F}^{-1} C\Gamma_m^H \Gamma_m(\mathcal{F} f_\theta(x^{(k)}))_m$ is the pseudodeblended output of the model's prediction. The mean absolute error is taken from the pseudodeblended output of the model's prediction and the original pseudo-deblended data, i.e. the input x. The action of the blending followed by the pseudodeblending operator $\mathcal{F}^{-1} C\Gamma_m^H \Gamma_m(\mathcal{F}(\cdot))_m$ can be implemented efficiently and directly in the time domain by first combining the traces according to the blended-acquisition time dithering code, then each bended shot-gather is copied a number of times equal to the corresponding source group size, and finally each of these copies is time-shifted (dithering decoded) to undo the delays introduced in the field. By adopting this blending loss, the deblending task is accomplished in a unsupervised way with the blended data and the blending matrix.

Figure 1:
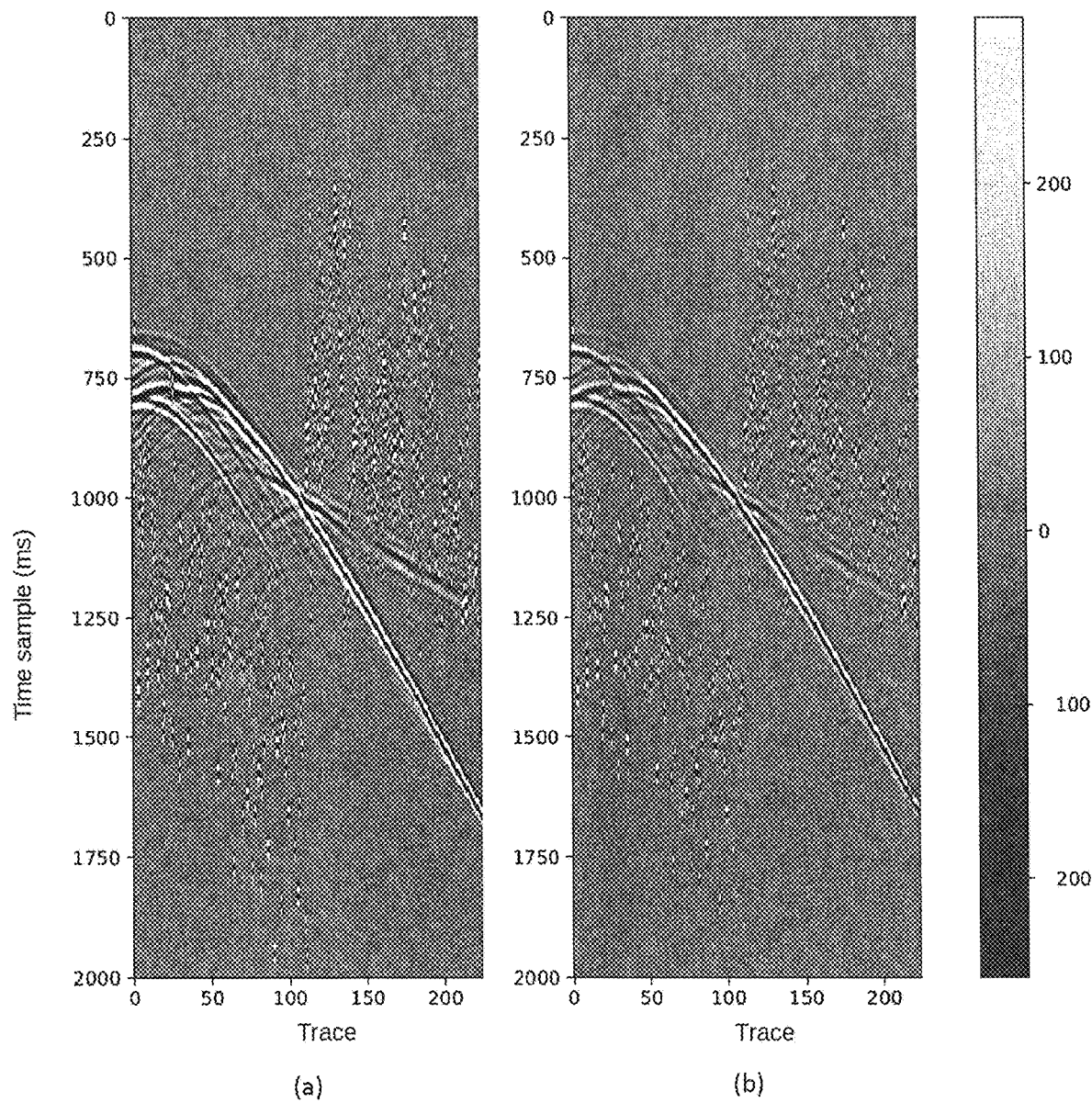
FIG. 1 This figure shows an example of the failed result by the normal convolutional neural network, according to the prior art, which trained with the blending loss. (a) is the input noisy data and (b) is the prediction after the convergence.

Direct minimization on this blending loss with a traditional deep CNN leads to identity mapping. It will produce the pseudo-deblended result which is exactly the least square solution. This phenomenon could be observed in FIG. 1. In this test, the blending factor is 2, i.e. every two shots are blended. Therefore, a simple scaling of ½ on both the noise and signal can perfectly satisfies a blending loss of 0.

To avoid this local minimum, a strong constraint for the model by making it trace-wise blind is proposed. According to this proposal, the coherent signal of the traces are essentially reconstructed from their adjacent traces, while not looking at themselves in the input. Thus for a specific trace, there would be no chance for its blending noise to be mapped from input to output. For those noises in its adjacent area, the model automatically neglect them due to their discontinuity and the convergence of the blending noise.

Figure 2:
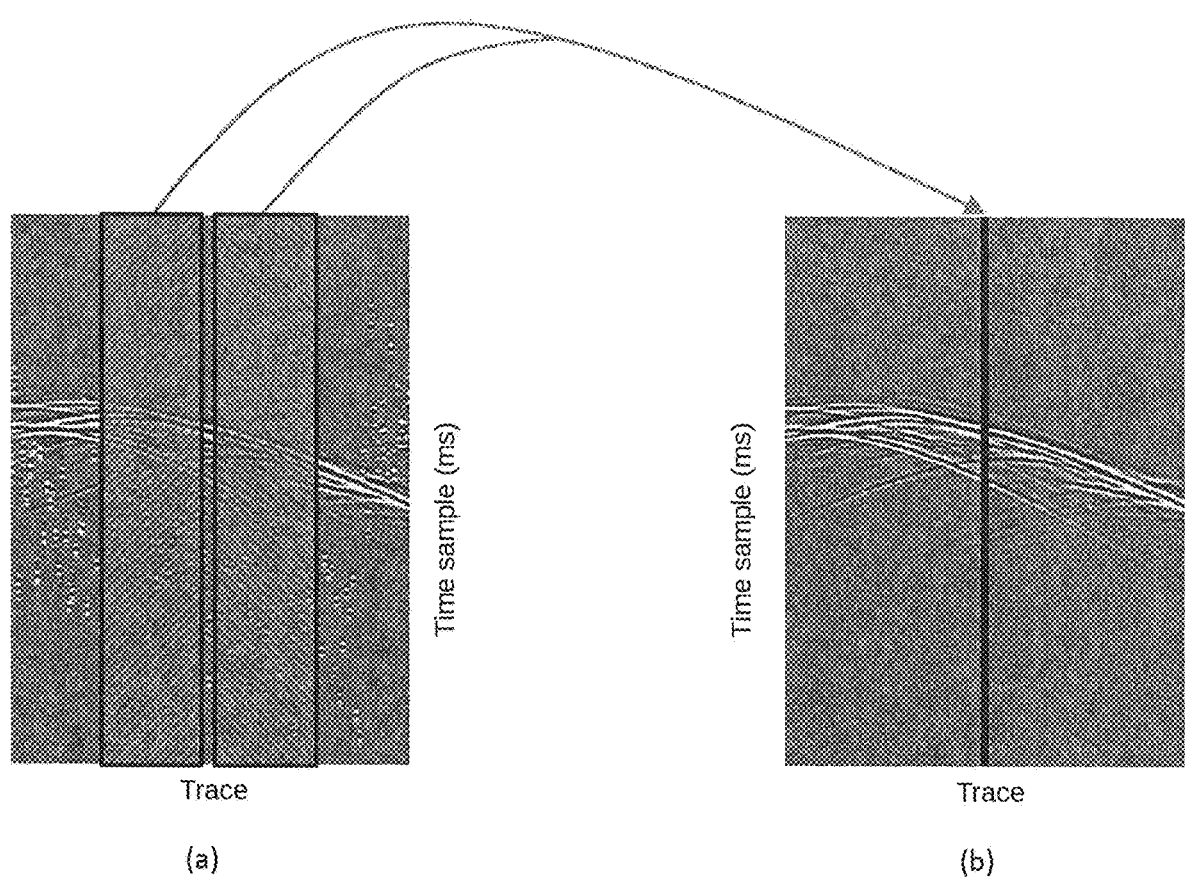
FIG. 2 This figure shows schematically the concept of a blind-trace method according to the invention. In order to recover the thick black line representing a trace in (b), only information in the dashed patches in (a) are used, ignoring the original noisy trace itself.

The illustration is shown in FIG. 2 where at the left side, two vertical bands with dashed with inclined lines shows two patches used when inputting information to recover the trace marked at the right side, ignoring the original noisy trace itself. This is why we name "blind-trace" the reference to the receptive field of the CNN.

Figure 3:
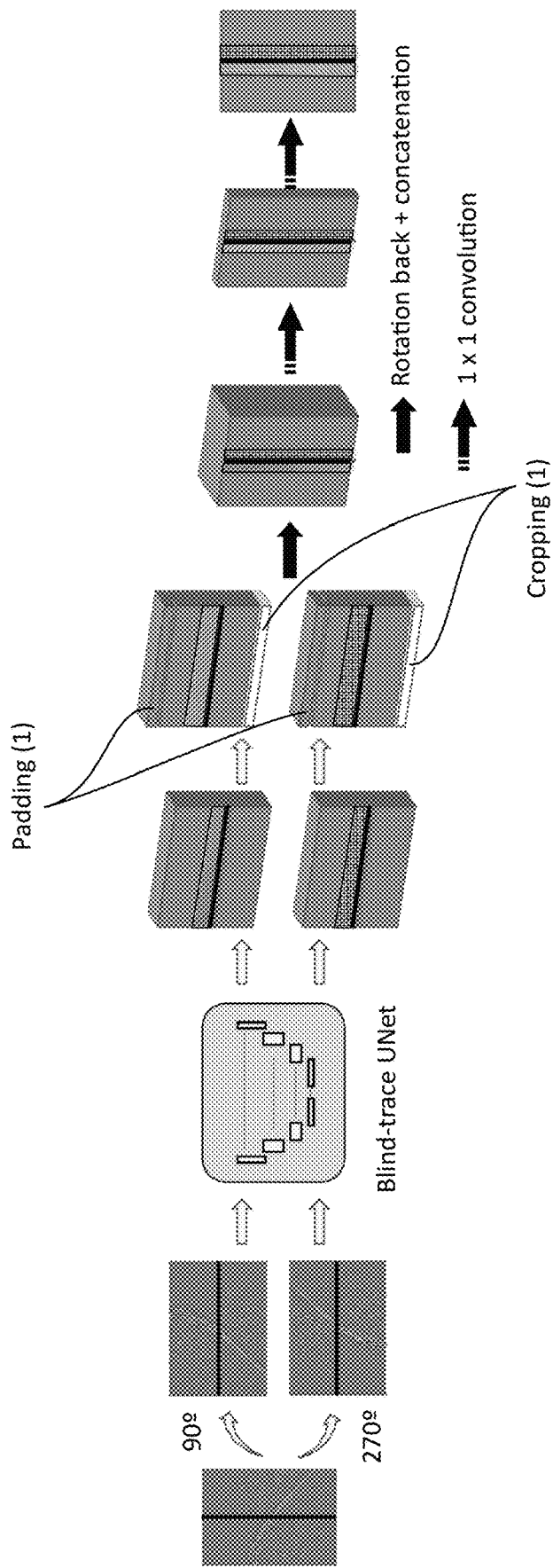
FIG. 3 This figure shows schematically the structure of the blind-trace network according to an embodiment of the invention. The thick black line marks a sample target trace. The dashed patches (the first patch with inclined lines and the second patch with Cartesian grid) indicates the areas used for predicting the predicted result. In the first layer after the blind-trace U-net, the patches cover the target trace, and with padding and cropping operations, the thick black line is excluded and the model is fully blind-trace.

According to this embodiment, the blind-trace convolutional neural network is constructed for the deblending task. The network structure is shown in FIG. 3. A deep CNN is constructed based on a modified version of the U-net with all convolutional layers and down-sampling layers changed for the receptive field restriction. In the beginning, the input seismic image is clockwise rotated twice with angles 90° and 270° so that both the left and right sections of the original receiver gather is moved upward, and they are separately inputted to the network. The network is composed of two parts, namely the blind-trace U-net and the merging layers, the merging layers being previously disclosed as the responsible for carrying out the combination of the two feature maps.

In the blind-trace U-net, the receptive field of each layer is strictly restricted to the upper half area for each row so that the model can extract the coherent features for each trace based on its left or right adjacent area in the original input respectively.

After the blind-trace U-net, the two output feature maps are cropped at the bottom and padded at the top such that the target traces can be excluded from its receptive field to fulfill the "blind-trace" purpose.

Then, they are rotated back (270° and 90° accordingly) and concatenated, followed by two consecutive 1×1 convolutional layers that integrate the feature maps and squeeze the channel size to 1.

In FIG. 3, a trace example is marked in black, the informative left and right areas of it at each stage are marked using two different patterns, a first pattern with inclined lines for the left patch and a second pattern with a square grid for the right patch respectively.

According to a preferred embodiment that may be applied to any of the disclosed examples, before the padding and cropping operations, the trace is buried under the patches, and at the end of the process, the trace will be excluded from the patches. For the edges, there is only one side of the patch that is informative and zeros are padded on the other side.

The image is processed only once and the network gives the predictions for all traces at the same time.

Figure 4:
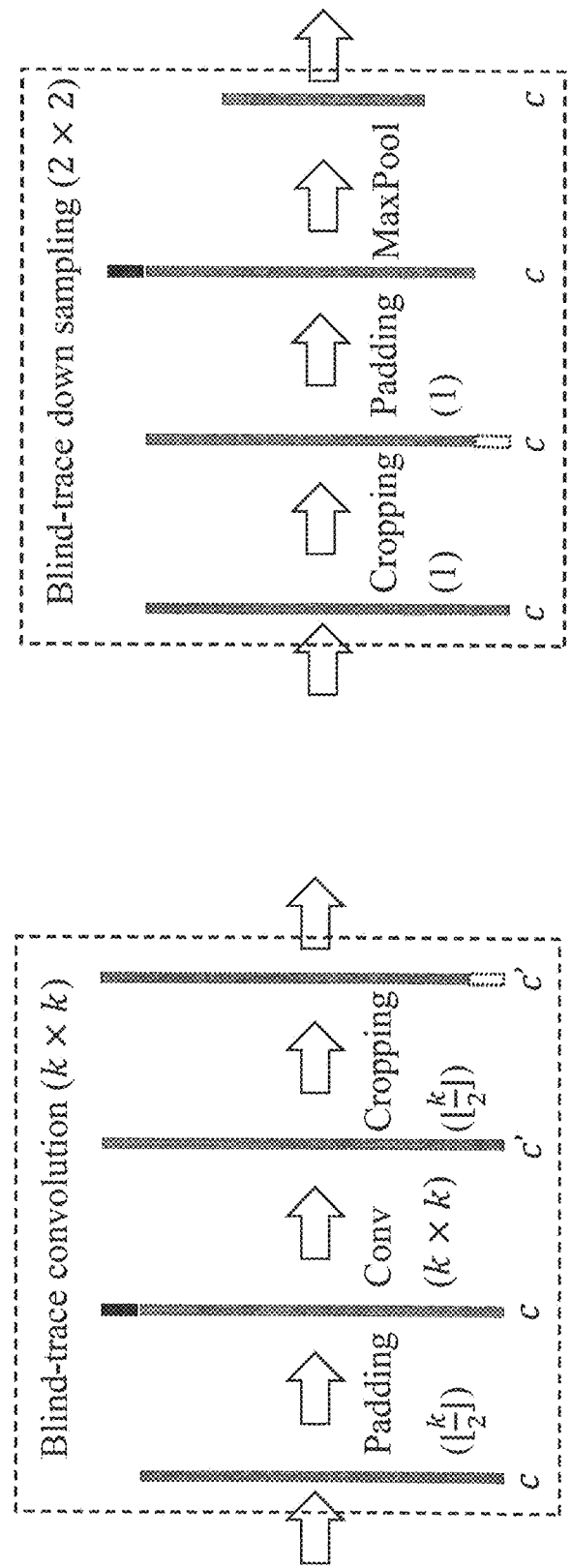
FIG. 4 This figure shows schematically the modified convolutional layer and max-pooling layer in a blind-trace network according to an embodiment of the invention.

Specifically, to constrain the receptive field within the upper half for all rows in the blind-trace U-net, the convolutional layers and down-sampling layers are changed as shown in FIG. 4.

Convolution: The feature maps are padded with zeros before each convolutional layer. Given the size of the filter k×k, $\lfloor k/2 \rfloor$ lines are padded on the top of the feature maps, and crop the $\lfloor k/2 \rfloor$ lines at the bottom after the convolution.

Max-pooling: The feature maps are padded on the top with one line and crop one at the bottom before max-pooling. There is no need to change the up-sampling layers since it does not affect the receptive filed after the modification for the down-sampling layers.

With the aforementioned changes, for a single trace in the feature maps, it takes the information purely from itself and the area above in the input. No information below it can leak into the result.

According to this embodiment, the rotated inputs are projected to 32 feature maps in the first layer. There are 4 contracting blocks and 4 expanding blocks in the blind-trace U-net, each of which consists of two consecutive modified convolutional layers and a max-pooling/up-sampling layer. The feature maps are doubled in the last convolutional layer of each contracting block and halved correspondingly in the expanding blocks.

Each blind-trace convolutional layer in the encoder is replaced by a blind-trace residual block (i.e. a residual block with all convolutional layers modified). Batch Normalization is adopted before each activation in the decoder.

The last two 1×1 convolutional layers project the concatenated 64 feature maps to 32 and 1 respectively. It has been used ReLU activation in the intermediate convolutional layers and leaky ReLU for the last 1×1 convolutional layer.

The proposed blind-trace network with blending loss combines the merits of both the conventional filter-based method and the inversion-based method.

The large number of the weights in the U-Net endows the network to achieve a complex non-linear filter to extract information from the coherent signal, meanwhile, for the low-SNR area where filters could not obtain any coherent information, the minimization of the blending loss reconstructs the coherent signal underneath through nonlinear inversion. This is a one-stage deblending framework and does not require much exhaustive and meticulous hyperparameter tuning.

Regarding the experiment, three different types of blending schemes are used to demonstrate the performance of the proposed method. The synthetic data examples can be seen in FIG. 5.

Figure 5:
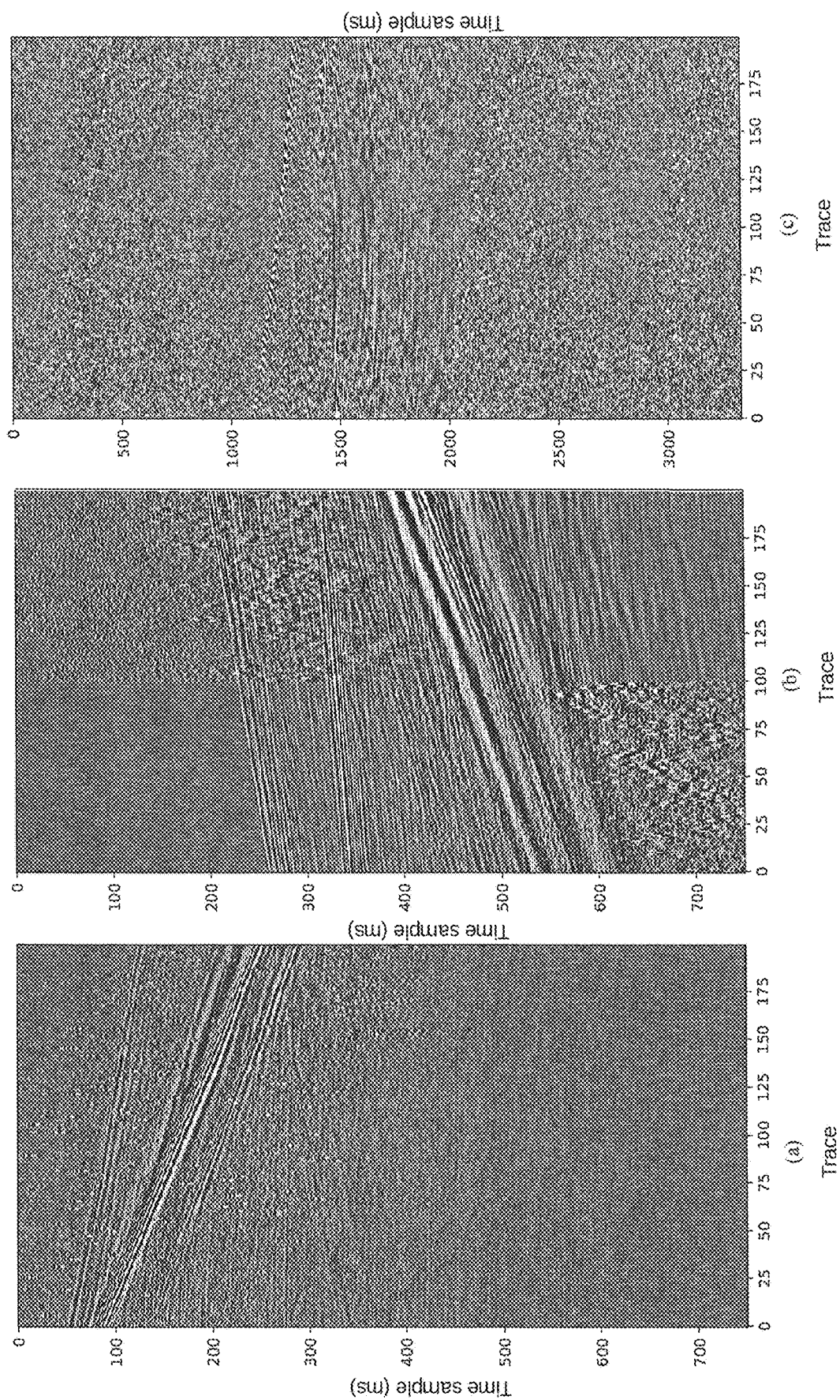
FIGS. 5 and 5 (continuation)
Figure 5:
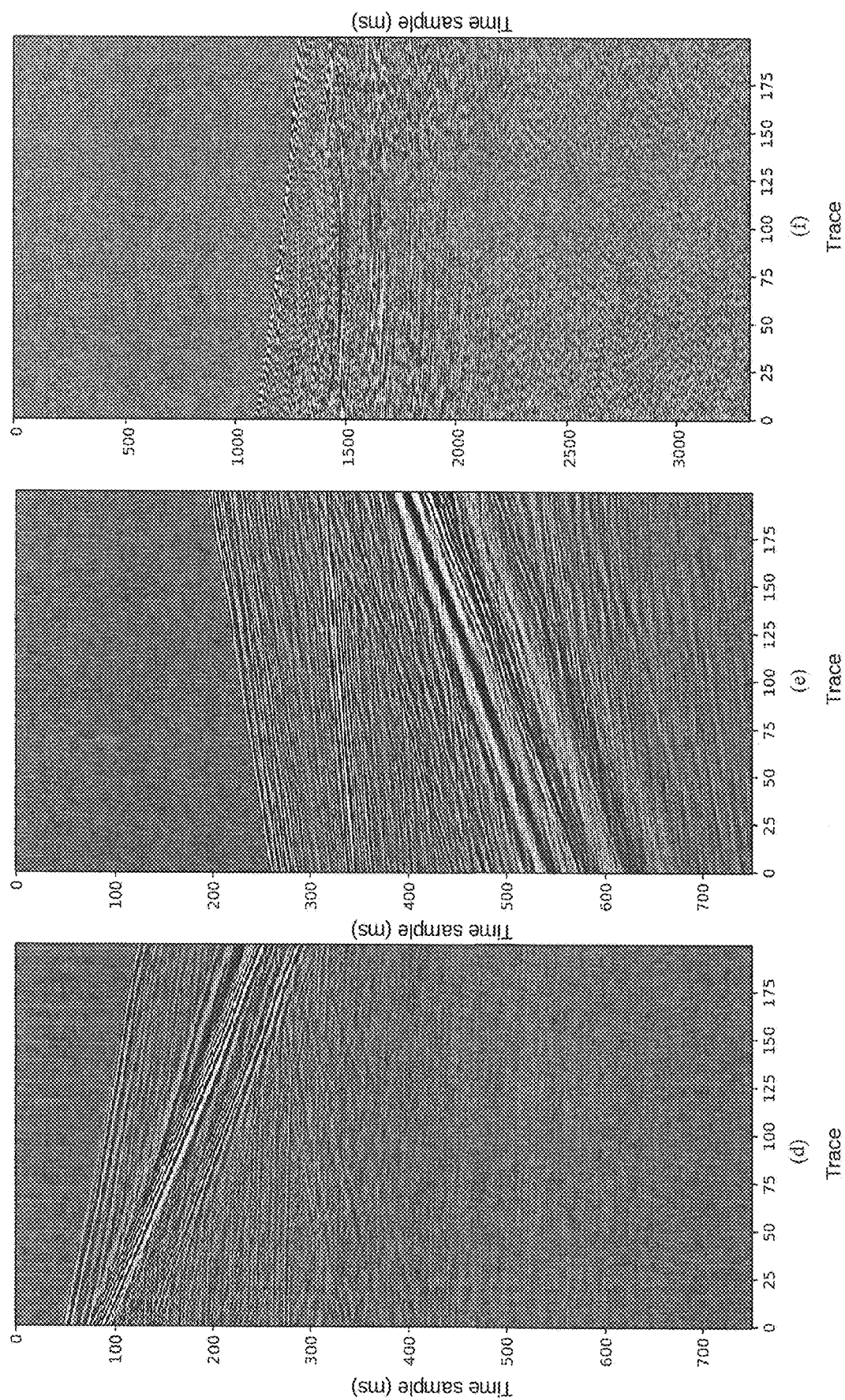

"alternate" blending. In this blending strategy, two consecutive shots are blended using short and random dithering time. After pseudo-deblending, the noise will cover the whole common receiver gather as shown in FIG. 5(*a*). Since the delay is short, the amplitudes of both signals and noises are at the same level. SEAMII-unconventional data is used for deblending test (SEAM denoting Society of Exploration Geophysicists and "II" denoting Phase II, Phase I refers to Subsalt imaging in tertiary basins and Phase II refers to Land seismic challenges. https://seg.org/News-Resources/Research-Data/Land-Seismic-Data).

200 unblended shots are collected with the size (1600 (receiver numbers)×750(time samples)). Random delays in the range of (0, 1]s are added to even shots and blended with the odd shots. The sampling period is 6 ms.

"half" blending. The second half of the shot gathers are shifted with relatively long delays and added to the first half. Noises in the pseudo-deblended common receiver gathers concentrate in the two corners of the image as shown in FIG. 5(*b*). Since the amplitude of blending noise from early arrivals is often much higher than late arrival signals, the SNR (signal/noise rate) is very low. SEAMII-unconventional data is used for deblending test. 200 unblended shots are extracted from the SEAMII-unconventional dataset with size (1600(receiver numbers)×750(time samples)). Shot 101 to 200 are blended accordingly to shot 1 to 100 with added random delays in the range of [2, 3]s. the sampling rate is 6 ms.

"continuous" blending. Simultaneous source of streamer acquisition is simulated in this experiment. A BP2004 velocity model is used for generating 200 consecutive unblended shots.

(BP2004 denotes the 2004 British Petroleum Velocity Benchmark. https://software.seg.org/datasets/2D/2004_BP_Vel_Benchmark/eage_abstract.pdf)

The shots have been recorded every 5 to 6 seconds continuously. There are 959 receivers for each record and 3334 samples along the time axis (dt=6 ms, hence T≈20 s). Approximately 4 shots are blended at different locations in the common receiver gathers. The noise level, in this case, is much higher than the other blending schemes as shown in FIG. 5(*c*).

FIGS. 5(*d*), 5(*e*) and 5(*f*) are the corresponding unblended data of that shown in FIGS. 5(*a*), 5(*b*) and 5(*c*) respectively.

Results of One-Stage Deblending

In order to avoid massive matrix multiplication in the f-x domain in loss computation, the blending and pseudo-deblending is performed in the time-space by applying dithering codes to the shots, followed by summation and cropping. In the first stage, the weights and bias are randomly initialized and trained with the Adam optimizer.

FIGS. 6 to 11 shows the deblending results using the blind-trace network and one-stage deblending for different blending schemes.

Figure 6:
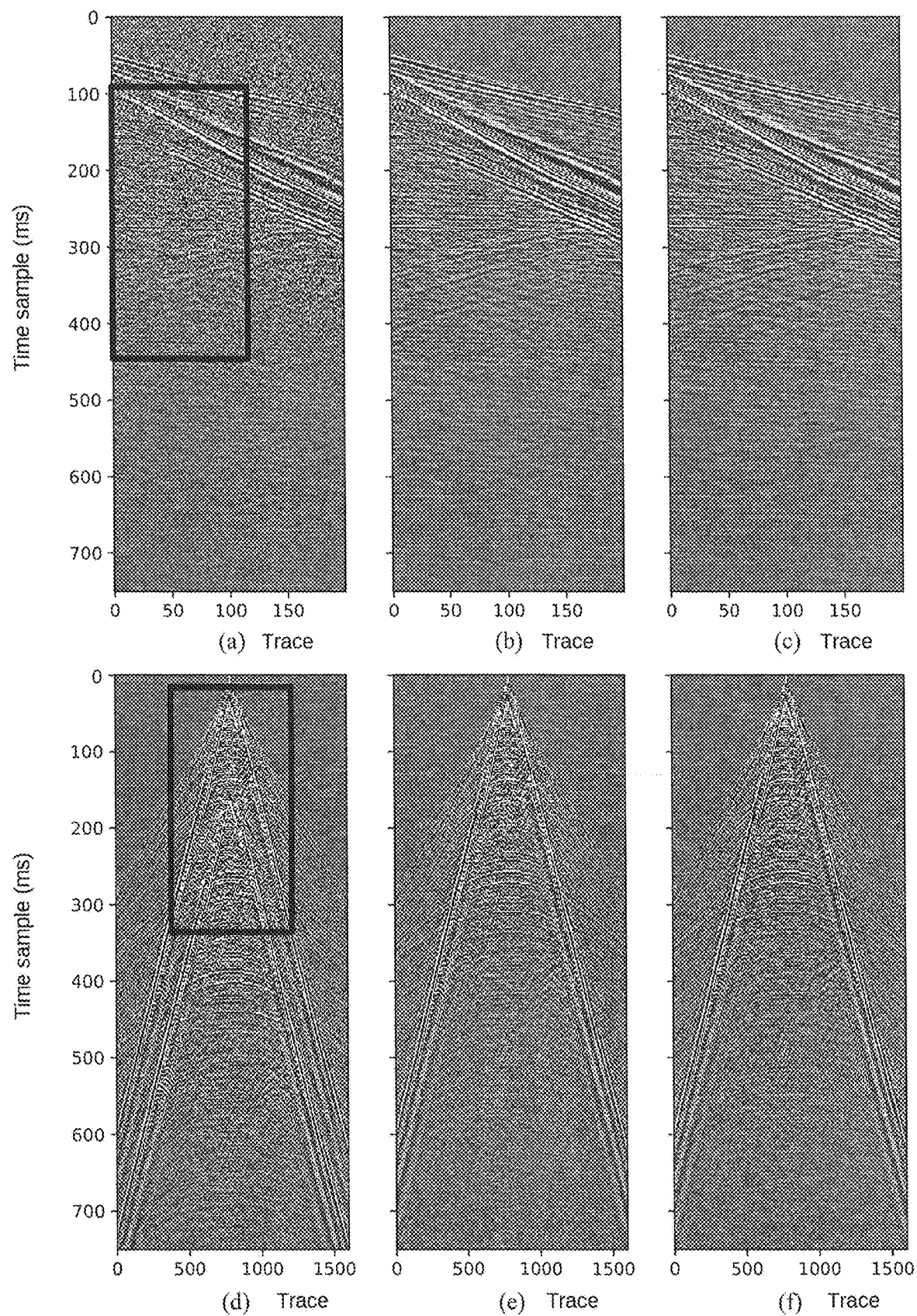
FIG. 6 This figure shows results of blended SEAM II-unconventional data. Figures (a)-(c) are the blended data (input), unblended data (ground truth), and the deblending result (prediction) respectively in the common receiver domain. Figures (d)-(f) are the blended data unblended data, and the deblending result in the common shot domain.
Figure 7:
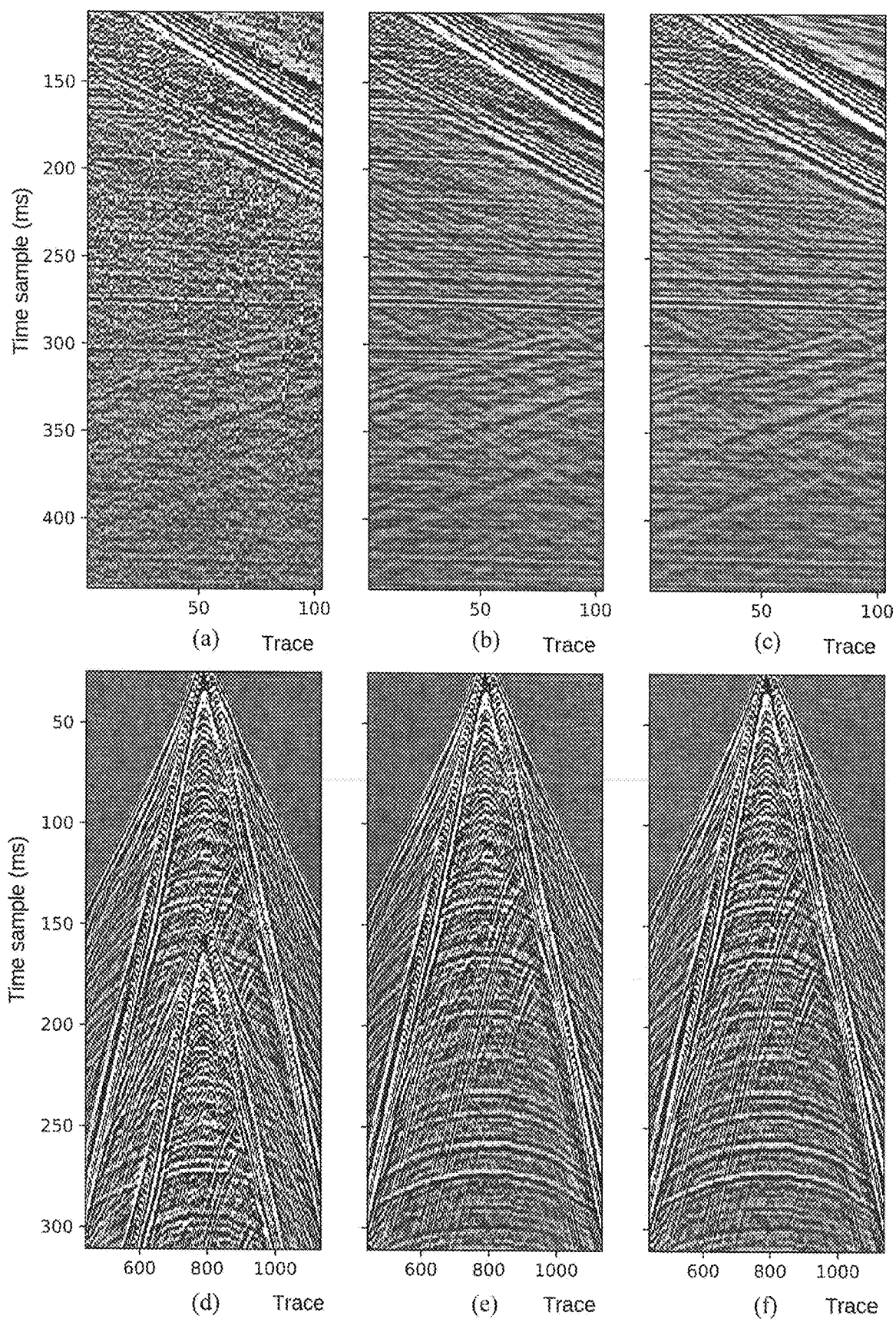
FIG. 7 This figure shows the zoom-in of the boxes shown on FIG. 6.
Figure 9:
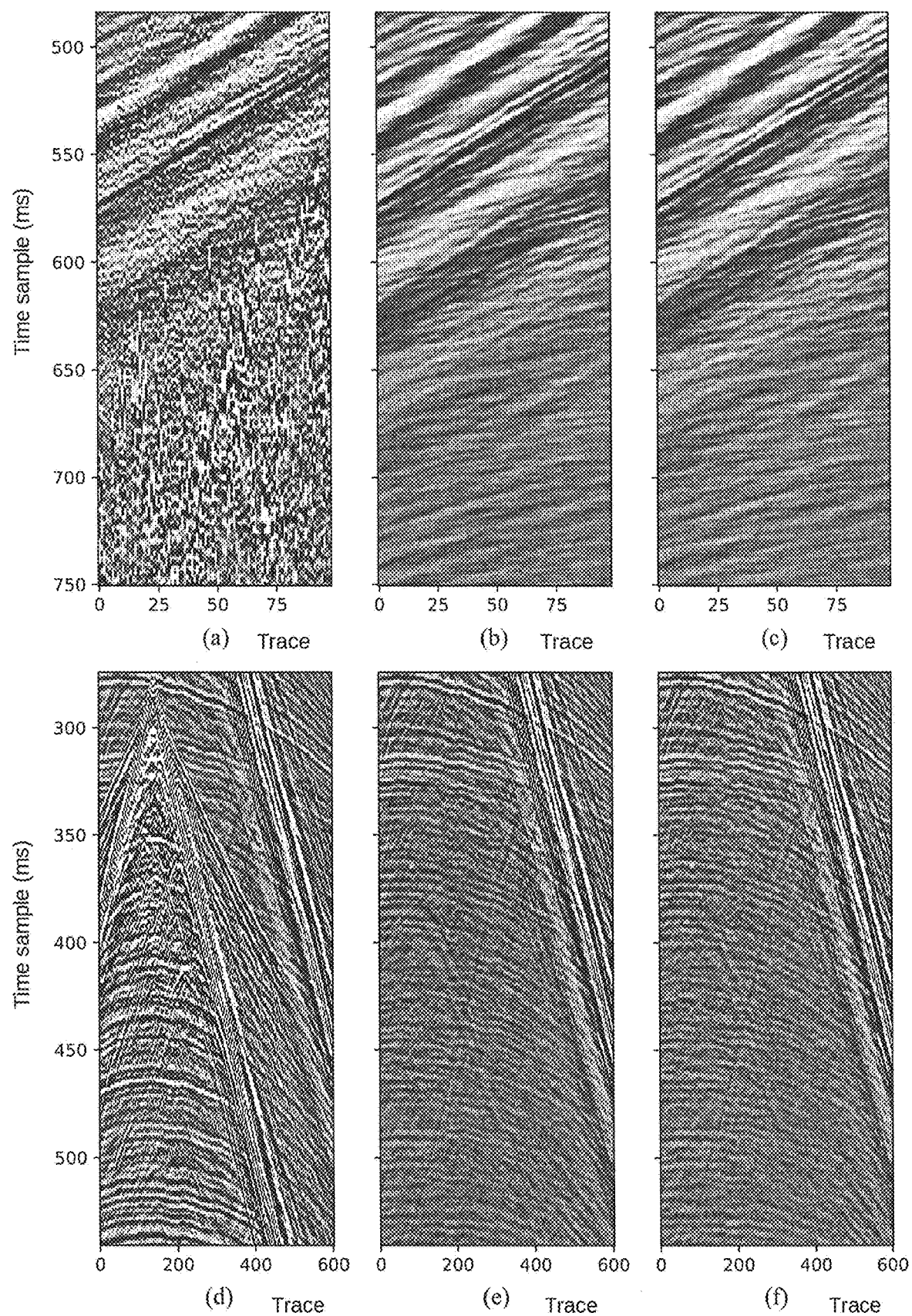
FIG. 9 This figure shows the zoom-in of the boxes shown on FIG. 8.

FIG. 6 presents the result of the "alternate" blending scheme. Short shifting between two consecutive shots prevents the early arrival noises from mixing with the late arrivals, but the noises distributed across the whole image. In FIG. 7 a zoom-in area of FIG. 9 is presented. From the demonstration in both common receiver domain and common shot domain, it is shown that the one-stage deblending can effectively remove the noises for both early arrivals and late arrivals, preserving the details for both low and high-frequency patterns.

Figure 8:
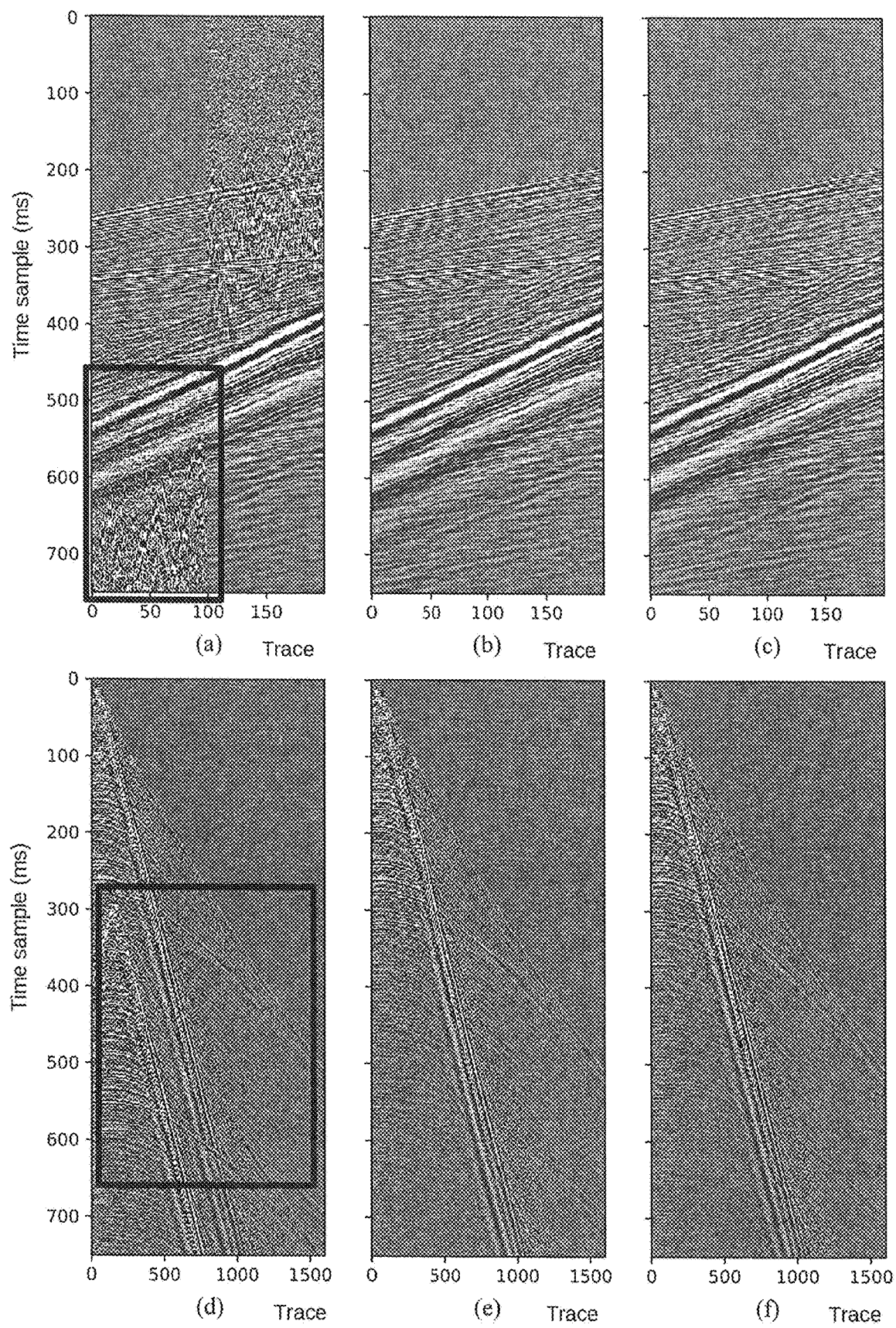
FIG. 8 This figure shows the results of the "half" blended SEAMII-unconventional data. Figures (a)-(c) are the blended data (input), unblended data (ground truth), and the deblending result (prediction) respectively in the common receiver domain. Figures (d)-(f) are the blended data unblended data, and the deblending result in the common shot domain.

"Half" blending scheme introduces more challenges for deblending models. Due to the concentration of the noises and long dithering time, the weak amplitudes in late arrivals are severely contaminated by strong noises from the early arrivals. As can be seen in FIG. 8 and the emphasized area of it in FIG. 9, traditional filters tend to fail due to the loss of coherency. Besides, the heteroscedasticity problem would increase the difficulty for the iterative method, in which harsh requirements are imposed for the accuracy of amplitude estimation. As shown in FIGS. 9(c) and (f), the proposed method not only works as a denoising model but also acts as non-linear inversion from the blending loss with the blind-trace regularization. The signals submerged by strong blending noises are reconstructed by optimization.

In "continuous" blending scheme, more unblended shots are collected within one blended shot. The noisy area enlarges to the whole image, and the signal is covered by multiple layers of noises. Less coherent information can be attained by the model.

Figure 10:
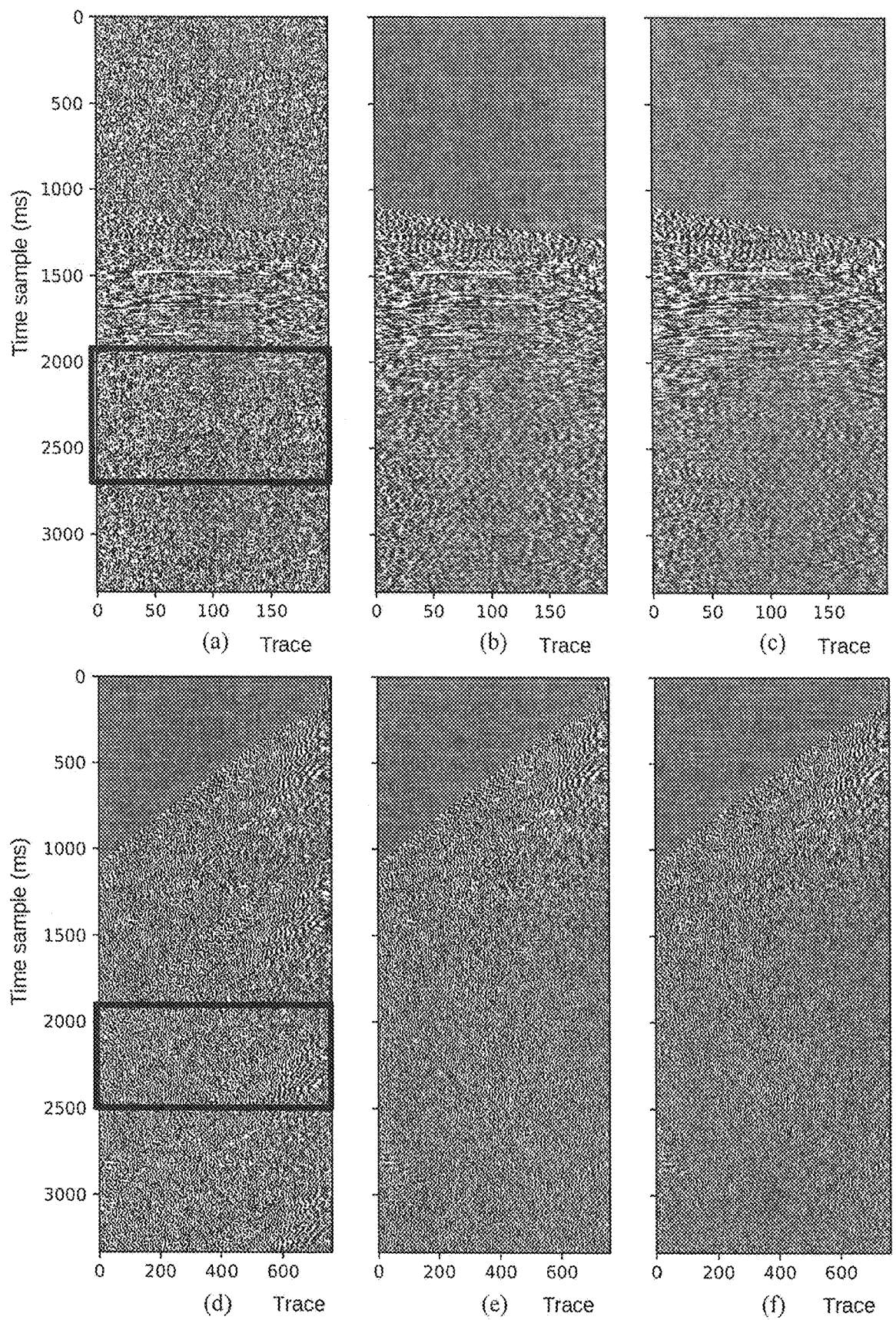
FIG. 10 This figure shows results of the "continuous" blended BP2004 data. Figures (a)-(c) are the blended data (input), unblended data (ground truth), and the deblending result (prediction) respectively in the common receiver domain. Figures (d)-(f) are the blended data unblended data, and the deblending result in the common shot domain.
Figure 11:
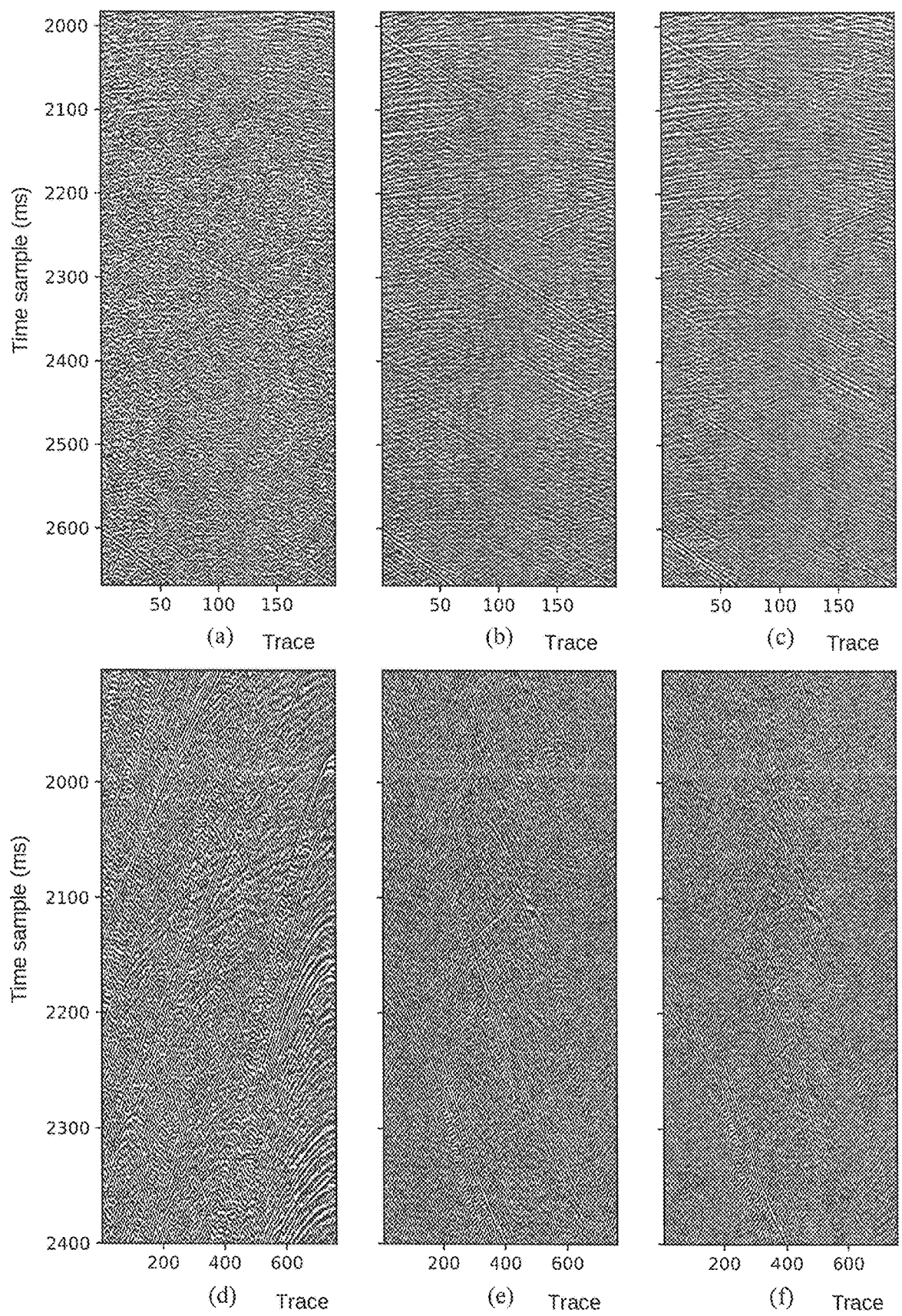
FIG. 11 This figure shows the zoom-in of the boxes shown on FIG. 10.

However, the one-stage deblending can still give a very good result as demonstrated in FIGS. 10 and 11.

The following table shows the blending loss comparison in different stages:

| Blending scheme | Pseudo-deblended | Training-stage | Tuning-stage |
| --- | --- | --- | --- |
| "alternate" | 0.5178 | 0.1594 | 0.1141 |
| "half" | 0.0674 | 0.0169 | 0.0072 |
| "continuous" | 0.3250 | 0.1176 | 0.0789 |

The invention claimed is:

1. A method for reconstructing at least one trace in a seismic image, the method comprising the steps of:
   a) providing a seismic image having seismic traces extracted from a data set acquired via a seismic survey, wherein the seismic image includes at least one seismic trace with data that is unavailable from the acquired data set;
   b) training a convolutional neural network to predict values for the unavailable data of the at least one trace, the convolutional neural network includes at least one layer having a kernel function configured to evaluate a bounded domain that defines a blind-trace receptive field, wherein the blind-trace receptive field encompasses data corresponding to a plurality of traces in the seismic image that are adjacent to, but exclude, the at least one trace having unavailable data;
   c) predicting values for the unavailable data of the at least one trace by inputting the seismic image into the trained convolutional neural network;
   d) reconstructing the at least one trace having unavailable data using the data values predicted in step c); and
   e) generating a reconstructed seismic image with the at least one trace reconstructed in step d).

2. The method according to claim 1, wherein the convolutional neural network is a U-net.

3. The method according to claim 2, wherein training the convolutional neural network includes using a converging criterion based on an approximation error estimation $E_s$ for measuring an interpolation loss when predicting the reconstructed trace, and the approximation error estimation $E_s$ being determined as a linear combination of a misfit loss and a regularization loss, the regularization loss being determined by the following steps:
   determining a main energy area of the seismic image; and
   calculating a norm of the reconstructed seismic image in the frequency domain limited to an area outside of the main energy area based on a predetermined norm.

4. The method according to claim 3, wherein the linear combination determining the approximation error estimation is:

$$E_s = \|\text{misfit loss}\| + \alpha \|\text{regularization loss}\|$$

wherein $\alpha$ is a positive weighting value and $\|\cdot\|$ the predetermined norm.

5. The method according to claim 4, wherein the misfit loss is determined as a difference between the seismic image and the reconstructed seismic image after removing the at least one reconstructed trace.

6. The method according to claim 1, wherein the at least one layer is a down-sampling layer.

7. The method according to claim 1, wherein the blind-trace receptive field of the kernel function is determined by the following processing steps:
   limiting a receptive field to one adjacent side of the at least one trace having unavailable data, the one adjacent side being determined based on a direction of the at least one trace having unavailable data;
   generating a first copy of the seismic image and a second copy of the seismic image, the second copy of the seismic image being rotated 180° with respect to the first copy of the seismic image; and
   inputting the first copy and the second copy of the seismic image into the convolutional neural network with the one-adjacent-sided receptive field resulting in two output images that are subsequently combined to form a single image.

8. The method according to claim 7, wherein the at least one layer with the blind-trace receptive field is a down-sampling layer and wherein any layer of the convolutional neural network includes an output for outputting a feature map and, wherein:
   before inputting a feature map, output of a previous layer or the image if the current layer is the first layer, into the current layer, the feature map is padded by adding rows of zeros at the end of the feature map located at one side of the trace;
   carrying out a convolution operation; and
   cropping out the same number of rows previously added wherein cropping the output feature map is carried out on the side opposite to the side on which rows were previously added.

9. A method for deblending seismic data in a receiver domain, the method comprising:
   deploying a plurality of $n_s$ acoustic sources in the upper surface of the reservoir domain wherein the plurality of $n_s$ acoustic sources are grouped into B groups $\sigma_l$, $l=1 \ldots B$, and wherein each of the $n_s$ acoustic sources is a member of only one of the groups $\sigma_l$ and is positioned at a location $x_i^s$, $i=1 \ldots n_s$, and deploying a plurality of $n_r$ acoustic receivers in the upper surface of the reservoir domain at a location $x_j^r$, $j=1 \ldots n_r$;

a) within each group $\sigma_l$, each of the acoustic sources fires a shot with a random delay time $\tau_{li}$ and responses thereto are received at the acoustic receivers and stored in a data structure represented by $P_{ljk}^b = (x_i^s, x_j^r, t_k - \tau_{li})$; wherein $t_k$ is the $k^{th}$ time sample in a time domain;

b) calculating, for each group $\sigma_l$, the Fourier-transform $\Pi^b$ $(:,:,\omega_k) = F \{P_{ljk}^b\}$ wherein $\omega_k$ is the $k^{th}$ frequency and ":" denoting variables depending in index i or index j;

c) for each frequency $\omega_k$, determining $\Pi^{LS}(:,:,\omega_k) = \Gamma^* \phi^b (:,:,\omega_k)$ wherein $\Gamma^*$ is $$\Gamma^* = \Gamma_k^H D$$

wherein D is a diagonal matrix and $\Gamma_k^H$ is the conjugate transpose of a blending matrix $\Gamma_k$ calculated from the random delay times $\tau_{li}$ as $$(\Gamma_k)_{li} = \begin{cases} e^{-\sqrt{-1}\omega_k \tau_{li}} & \text{for } x_i^s \in \sigma_l \\ 0 & \text{else} \end{cases}$$

d) calculating an Inverse Fourier Transform of $F^{-1}(\Pi^{LS}(:,:,\omega_k)) = P_{ljk}$;

e) a shot-gather ordering in the output $P_{ljk}$ is sorted to get an image $I_j$ of trace data in a common-receiver domain, a common-midpoint receiver, or a common-offset receiver, and the time domain; and f) for each trace, carrying out a deblending step by reconstructing a coherent signal of the traces using the reconstructing method according to claim 1.

10. The method for deblending seismic data according to claim 9, wherein $D = (\Gamma_k \Gamma_k^H)^{-1}$.

11. The method for deblending seismic data according to claim 9, wherein $D = I$, wherein I denotes the identity matrix.

12. The method for deblending seismic data according to claim 9, wherein each source is shot once and wherein for all $m \neq n$, $\sigma_m \cap \sigma_n = \emptyset$.

13. A non-transitory computer program product stored on a computer-readable medium and comprising computer-implementable instructions, which, when executed by a computer, cause the computer to carry out the method according to claim 1.

14. A computer system having a processor and a non-transitory computer-readable medium storing computer-executable instructions which, when executed by the processor, cause the processor to carry out the method according to claim 1.

* * * * *